3,586,690
PROCESS FOR PREPARING 2 - BENZO-
THIAZOLONES FROM AROMATIC NITRO
COMPOUNDS
Ehrenfried H. Kober, Hamden, Conn., and Gerhard F. Ottmann, Wuppertal-Elberfeld, Germany, assignors to Olin Corporation, New Haven, Conn.
No Drawing. Filed Oct. 2, 1968, Ser. No. 764,596
Int. Cl. C07d 91/44
U.S. Cl. 260—304                    13 Claims

ABSTRACT OF THE DISCLOSURE

The process for preparing 2-benzothiazolones by reacting an aromatic nitro compound, in which at least one of the two ortho positions is unsubstituted, with carbonyl sulfide in the presence of selected catalysts, and recovering the 2-benzothiazolones produced thereby.

This invention relates to a process for preparing 2-benzothiazolones from aromatic nitro compounds.

2-benzothiazolone, having the structural Formula I (I)

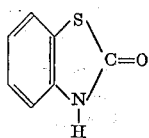

which is tautomeric with 2-hydroxybenzothiazole of structural Formula II, (II)

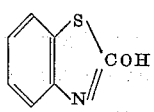

has been prepared in a variety of ways from ortho-aminothiophenol and phosgene, by hydrolysis of 2-chlorobenzothiazole, or by dealkylation of 2-alkoxybenzothiazoles. These and other previously known techniques for preparing 2-benzothiazolones have been expensive and complicated.

2-benzothiazolones may be used to prepare derivatives such as 2-mercaptobenzothiazoles which are useful as accellerators in the vulcanization of rubber, and to prepare derivatives which are useful as dyestuffs or as photographic sensitizers, and as cyanines.

It is a primary object of this invention to provide an improved process for preparing 2-benzothiazolones.

It is a further object of this invention to provide a process for preparing 2-benzothiazolones from aromatic nitro compounds.

These and other objects of the invention will be apparent from the following detailed description.

It has now been discovered that the foregoing objects are accomplished when an aromatic nitro compound, in which at least one of the two ortho positions is unsubstituted, is reacted with carbonyl sulfide in the presence of selected catalysts, and the resulting benzothiazolone is recovered from the reaction mixture.

More in detail, any aromatic nitro compound having at least one of the two ortho positions unsubstituted may be employed as a reactant. The term "aromatic nitro compound," as used throughout the description and claims, is intended to include unsubstituted as well as substituted aromatic nitro compounds, with the provision that at least one of the two ortho positions is unsubstituted. Typical examples of suitable aromatic nitro compounds which can be reacted to form benzothiazolones include the following:

(1) nitrobenzene
(2) o-, m- or p-nitrotoluenes
(3) o-, m- or p-monofluoronitrobenzenes
(4) o-, m- or p-monofluoronitrobenzenes
(5) o-, m- or p-monobromonitrobenzenes
(6) 3- or 4-nitro-o-oxylenes
(7) 4-, 5- or 6-nitro-m-xylenes
(8) 2-nitro-p-xylenes
(9) 3- or 4-nitro-o-dichlorobenzenes
(10) 4-, 5- or 6-nitro-m-dichlorobenzenes
(11) 2-nitro-p-dichlorobenzenes
(12) 3- or 4-nitro-o-dibromobenzenes
(13) 4- or 5-nitro-1,2,3-trichlorobenzenes
(14) 5- or 6-nitro-1,2,4-trichlorobenzenes
(15) o-, m- or p-nitro biphenyls
(16) 1- or 2-nitro naphthalenes
(17) bis(o-, m- or p-nitro phenyl)ethers
(18) bis(o-, m- or p-nitro phenyl)methanes
(19) bis(o-, m- or p-nitro phenyl)ethanes
(20) bis(o-, m- or p-nitro phenoxy)ethanes
(21) bis(o-, m- or p-ntro phenoxy)butanes
(22) bis(o-, m- or p-nitro phenyl)dialkylethers
(23) bis(o-, m- or p-nitro phenoxy)dialkylethers All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato and the like, and employed as reactants in the novel process of this invention, provided that at least one of the two positions ortho to one of the nitro groups is unsubstituted.

In addition, isomers and mixtures of the aforesaid aromatic nitro compounds and substituted aromatic nitro compounds may also be employed, as well as homologues and other related compounds. Generally, the aromatic nitro compounds and substituted aromatic nitro compounds contain between about 6 and about 16 carbon atoms.

Catalysts which may be utilized in the novel technique of this invention include compounds of elements found in Group Vb of the Periodic Table shown on page 122 of Inorganic Chemistry, by Moeller, John Wiley and Sons, Inc., 1952. Particularly suitable are the elements phosphorus, arsenic, antimony and bismuth, and compounds thereof. It was found that certain compounds of these elements have a much greater catalytic effect than others, when compared on an equal weight basis. Those compounds which are preferred because they show the greatest catalytic effect are organic phosphorous compounds and inorganic antimony compounds.

Typical examples of suitable organic phosphorous compounds are as follows:

(1) Disodium phenylphosphate
(2) Dioctyl chlorophosphate
(3) Trimeric phosphonitrilic chloride
(4) Tetrameric phosphonitrilic chloride
(5) Triphenylphosphine oxide
(6) Tricresylphosphine oxide
(7) Triphenylphosphine
(8) Tricresylphosphine
(9) Trioctylphosphine
(10) Trioctylphosphine oxide
(11) Tris(hydroxymethyl)phosphine
(12) Tris(hydroxymethyl)phosphine oxide
(13) Tetrakis(hydroxymethyl)phosphonium chloride Typical examples of suitable inorganic antimony compounds are as follows:

(1) Antimony trisulfide ($Sb_2S_3$)
(2) Antimony pentasulfide ($Sb_2S_5$)
(3) Antimony trioxide ($Sb_2O_3$)
(4) Antimony tetraoxide ($Sb_2O_4$)
(5) Antimony pentaoxide ($Sb_2O_5$)
(6) Antimony oxychloride ($SbOCl$)

In carrying out the process of this invention, the aromatic nitro compound and catalyst are placed in a suitable pressure vessel, such as an autoclave, which is equipped with a gas sparger for feeding gas into the bottom thereof. The pressure vessel is also preferably provided with agitation means as well as cooling and heating means. After the slurry or solution of catalyst and aromatic nitro compound is placed into the pressure vessel, it is sealed, and carbonyl sulfide is pumped into the pressure vessel through the gas sparger until the desired pressure is obtained under the temperature conditions employed. Optionally a desired amount of carbonyl sulfide might be added as a liquid, before the pressure vessel is closed.

After the desired temperature and pressure conditions are obtained, carbonyl sulfide may be fed continuously through the sparger into the suspension of catalyst and aromatic nitro compound during the entire reaction period while maintaining the pressure at the desired level.

The order of mixing the reactants is not critical and may be varied within the limitations of the equipment employed. In one embodiment, the aromatic nitro compound, catalyst system, carbonyl sulfide in liquid form and, if desired, solvent, are charged to a suitable pressure vessel such as an autoclave which was previously purged with nitrogen, and which is preferably provided with agitation means such as a stirrer or an external rocking mechanism. The operating pressure can be attained by heating and/or by feeding carbonyl sulfide into the autoclave. The operating pressure after heating or after feeding carbonyl sulfide into the closed autoclave is in the range between about 30 and about 10,000 p.s.i.g., and preferably between about 100 and about 2000 p.s.i.g., but greater or lesser pressures may be employed if desired.

Generally the quantity of carbonyl sulfide in the free space of the reactor is maintained at a level sufficient to maintain the desired pressure as well as to provide reactant for the process, as the reaction progresses. If desired, additional carbonyl sulfide can be fed to the reactor either intermittently or continuously as the reaction progresses to maintain the pressure within the above range. The total amount of carbonyl sulfide added is generally between about 1 and about 50, and preferably between about 2 and about 15 moles of carbonyl sulfide per nitro group in the aromatic nitro compound. Greater or lesser amounts may be employed if desired. The highest carbonyl sulfide requirements are generally utilized in a process in which the gas is added continuously, but suitable recycle of the gas stream greatly reduces the overall consumption of carbonyl sulfide.

The molar proportion of catalyst to aromatic nitro compound in the reaction is generally equivalent to between about 1:1000 and about 1:1, and preferably between about 1:100 and about 1:2. However, greater or lesser proportions may be employed if desired.

The reaction between carbonyl sulfide and aromatic nitro compound may be effected in the absence of a solvent, but improved overall yields of the benzothiazolones can be obtained when a solvent which is chemically inert to the components of the reaction system is employed. Suitable solvents include aliphatic, cycloaliphatic, aromatic solvents such as n-heptane, cyclohexane, benzene, toluene, and xylene, and halogenated aliphatic and aromatic hydrocarbons such as dichloromethane, trichloroethylene, perchloroethylene, tetrachloroethane, monochlorobenzene, dichlorobenzene, and chloronaphthalene, as well as sulfur dioxide, mixtures thereof and the like.

The proportion of solvent is not critical and any proportion may be employed which will not require excessively large equipment to contain. Generally the weight percent of aromatic nitro compound in the solvent is in the range between about 2.0 and about 75 percent, but greater or lesser proportions may be employed if desired.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, on the catalyst and on the amount of catalyst being charged, as well as the type of equipment being employed. Usually between one-half hour and 20 hours are required to obtain the desired degree of reaction in a batch operation, but shorter or longer reaction times may be employed. In a continuous process, the reaction time may be much lower, i.e., substantially instantaneous and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the 2-benzothiazolones from the reaction product. However, other suitable separation techniques such as extraction, sublimation, etc., may be employed to separate the 2-benzothiazolone from the unreacted aromatic nitro compound and any bi-products that may be formed.

The following examples are presented to describe the invention more fully without any intention of being limited thereby. All parts and percentages are by weight unless otherwise specified.

EXAMPLE 1

A 300 milliliter stainless steel autoclave, secured to a mechanically driven rocking means, and having an internal cooling coil and an external heating mantle, was charged with 25 grams of nitrobenzene (0.20 mole), 3 grams of triphenylphosphine (0.011 mole), and 51 grams of carbonyl sulfide (0.85 mole). The autoclave had attained a pressure of 600 p.s.i.g. after it had been heated to about 134° C. The rocking means, capable of rocking the autoclave at the rate of 36 cycles per minute, was operated during the 12 hour reaction period. At the end of this period, the autoclave was cooled to room temperature, gases were vented and the liquid reaction mixture was withdrawn and analyzed by vapor phase chromatography and infrared spectroscopy. The analyses revealed that the liquid reaction product contained 12 percent nitrobenzene, 42.5 percent aniline and 12.8 percent 2-benzothiazolone. Recovery of the 2-benzothiazolone substantially free of the other reaction products, was achieved by extraction of the crude reaction with dilute aqueous sodium hydroxide, followed by acidification to the aqueous base with hydrogen chloride to liberate the free 2-benzothiazolone.

EXAMPLE 2

The procedure of Example 1 was repeated with the exception that the molar ratio of carbonyl sulfide to nitrobenzene was 2.6, the catalyst was triphenylphosphine oxide, and the molar ratio of catalyst to nitrobenzene was 0.044. The reaction time was 8 hours, the reaction temperature ranged from 182–212° C., and the reaction pressure ranged from 350–410 p.s.i.g. The conversion of nitrobenzene was 35 percent and the corrected yield of 2-benzothiazolone was 11 percent.

EXAMPLE 3

The procedure of Example 1 was repeated with the exception that the molar ratio of carbonyl sulfide to nitrobenzene was 2.6, the catalyst was dioctyl chlorophosphate, and the molar ratio of catalyst to nitro benzene was 0.074. The reaction time was 8 hours, the reaction temperature ranged from 182–212° C., and the reaction pressure ranged from 350–410 p.s.i.g. The conversion of nitrobenzene was 15 percent and the corrected yield of 2-benzothiazolone was 21 percent.

EXAMPLE 4

The procedure of Example 1 was repeated with the exception that the molar ratio of carbonyl sulfide to nitrobenzene was 2.6, the catalyst was disodium phenylphosphate, and the molar ratio of catalyst to nitrobenzene was 0.065. The reaction time was 8 hours, the reaction temperature ranged from 182–212° C., and the reaction pressure ranged from 350–410 p.s.i.g. The conversion of nitrobenzene was 3 percent and the corrected yield of 2-benzothiazolone was 40 percent.

EXAMPLE 5

The procedure of Example 1 was repeated with the exception that the molar ratio of carbonyl sulfide to nitrobenzene was 4.1, the catalyst was trimeric phosphonitrilic chloride, and the molar ratio of catalyst to nitrobenzene was 0.04. The reaction time was 4 hours, the reaction temperature was 147° C., and the reaction pressure was 550 p.s.i.g. The conversion of nitrobenzene was 83 percent and the corrected yield of 2-benzothiazolone was 6.5 percent.

EXAMPLE 6

The procedure of Example 1 was repeated with the exception that the molar ratio of carbonyl sulfide to nitrobenzene was 3.3, the catalyst was tetrakis(hydroxymethyl) phosphonium chloride, and the molar ratio of catalyst to nitrobenzene was 0.05. The reaction time was 5 hours, the reaction temperature ranged from 130–150° C., and the reaction pressure was 560 p.s.i.g. The conversion of nitrobenzene was 41 percent and the corrected yield of 2-benzothiazolone was 2.2 percent.

EXAMPLE 7

The procedure of Example 1 was repeated with the exception that the molar ratio of carbonyl sulfide to nitrobenzene was 4.3, the catalyst was antimony trisulfide ($Sb_2S_3$), and the molar ratio of catalyst to nitrobenzene was 0.04. The reaction time was 12 hours, the reaction temperature was 134° C., and the reaction pressure was 600 p.s.i.g. The conversion of nitrobenzene was 47 percent and the corrected yield of 2-benzothiazolone was 14 percent.

What is desired to be secured by Letters Patent is:

1. The process for preparing 2-benzothiazolones which comprises reacting carbonyl sulfide with an aromatic nitro compound in the presence of a catalytic proportion of a catalyst,
   (a) said aromatic nitro compound being selected from the group consisting of

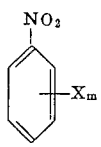

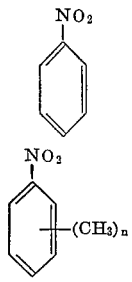

where $n$ is 1–2,

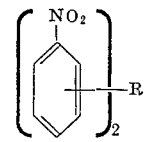

where X is halo and $m$ is 1–3,

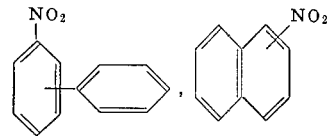

and where R is oxygen or $C_1$–$C_4$ alkylene,
   (b) said catalyst being selected from the group consisting of:
      (1) Disodium phenylphosphate
      (2) Dioctyl chlorophosphate
      (3) Trimeric phosphonitrilic chloride
      (4) Tetrameric phosphonitrilic chloride
      (5) Triphenylphosphine oxide
      (6) Tricresylphosphine oxide
      (7) Triphenylphosphine
      (8) Tricresylphosphine
      (9) Trioctylphosphine
      (10) Trioctylphosphine oxide
      (11) Tris(hydroxymethyl)phosphine
      (12) Tris(hydroxymethyl)phosphine oxide
      (13) Tetrakis(hydroxymethyl)phosphonium chloride
      (14) Antimony trisulfide ($Sb_2S_3$)
      (15) Antimony pentasulfide ($Sb_2S_5$)
      (16) Antimony trioxide ($Sb_2O_3$)
      (17) Antimony tetraoxide ($Sb_2O_4$)
      (18) Antimony pentoxide ($Sb_2O_5$) and
      (19) Antimony oxychloride (SbOCl),
   (c) wherein the reaction temperature is in the range between about 25 and about 250° C., and
   (d) the reaction pressure is in the range between about 30 and about 10,000 p.s.i.g.

2. The process of claim 1 wherein the molar proportion of catalyst to said aromatic nitro compound is in the range between about 1:1 and about 1:1000.

3. The process of claim 1 wherein the reaction temperature is in the range between about 100 and about 250° C. and the reaction pressure is in the range between about 100 and 2,000 p.s.i.g.

4. The process of claim 2 wherein the molar proportion of catalyst to said aromatic nitro compound is in the range between about 1:2 and about 1:100.

5. The process of claim 1 wherein said aromatic nitro compound is selected from the group consisting of nitrobenzene and ortho-chloro nitrobenzene.

6. The process of claim 5 wherein the molor proportion of carbonyl sulfide to aromatic nitro compound is in the range between about 2:1 and about 15:1.

7. The process of claim 6 wherein said aromatic nitro compound is nitrobenzene and said catalyst is triphenylphosphine.

8. The process of claim 6 wherein said aromatic nitro compound is nitrobenzene and said catalyst is triphenylphosphine oxide.

9. The process of claim 6 wherein said aromatic nitro compound is nitrobenzene and said catalyst is dioctyl chlorophosphate.

10. The process of claim 6 wherein said aromatic nitro compound is nitrobenzene and said catalyst is disodium phenylphosphate.

11. The process of claim 6 wherein said aromatic nitro compound is nitrobenzene and said catalyst is trimeric phosphonitrilic chloride.

12. The process of claim 6 wherein said aromatic nitro compound is nitrobenzene and said catalyst is tetrakis(hydroxymethyl)phosphonium chloride.

13. The process of claim 6 wherein said aromatic nitro compound is nitrobenzene and said catalyst is antimonous sulfide ($Sb_2S_3$).

References Cited

UNITED STATES PATENTS 3,275,646  9/1966  Kirby et al. _____ 260—304

ALEX MAZEL, Primary Examiner

R. J. GALLAGHER, Assistant Examiner